(No Model.) 7 Sheets—Sheet 1.
J. A. MATHIEU.
APPARATUS FOR DISTILLING WOOD.
No. 300,383. Patented June 17, 1884.
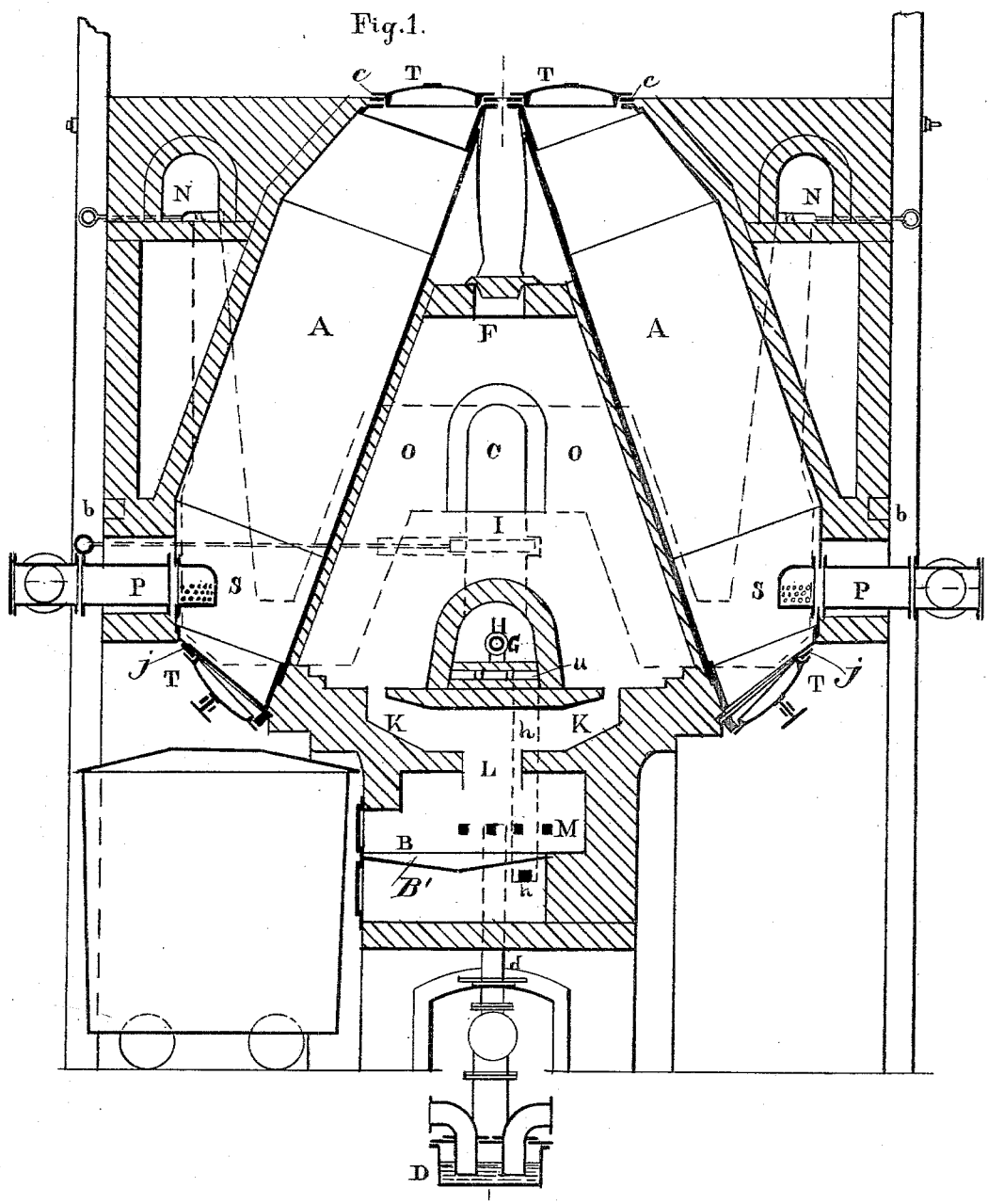
Witnesses
Sumner Collins
Geo. H. Carlisle
Inventor
Jean A. Mathieu (No Model.)  7 Sheets—Sheet 2.
J. A. MATHIEU.
APPARATUS FOR DISTILLING WOOD.
No. 300,383. Patented June 17, 1884.
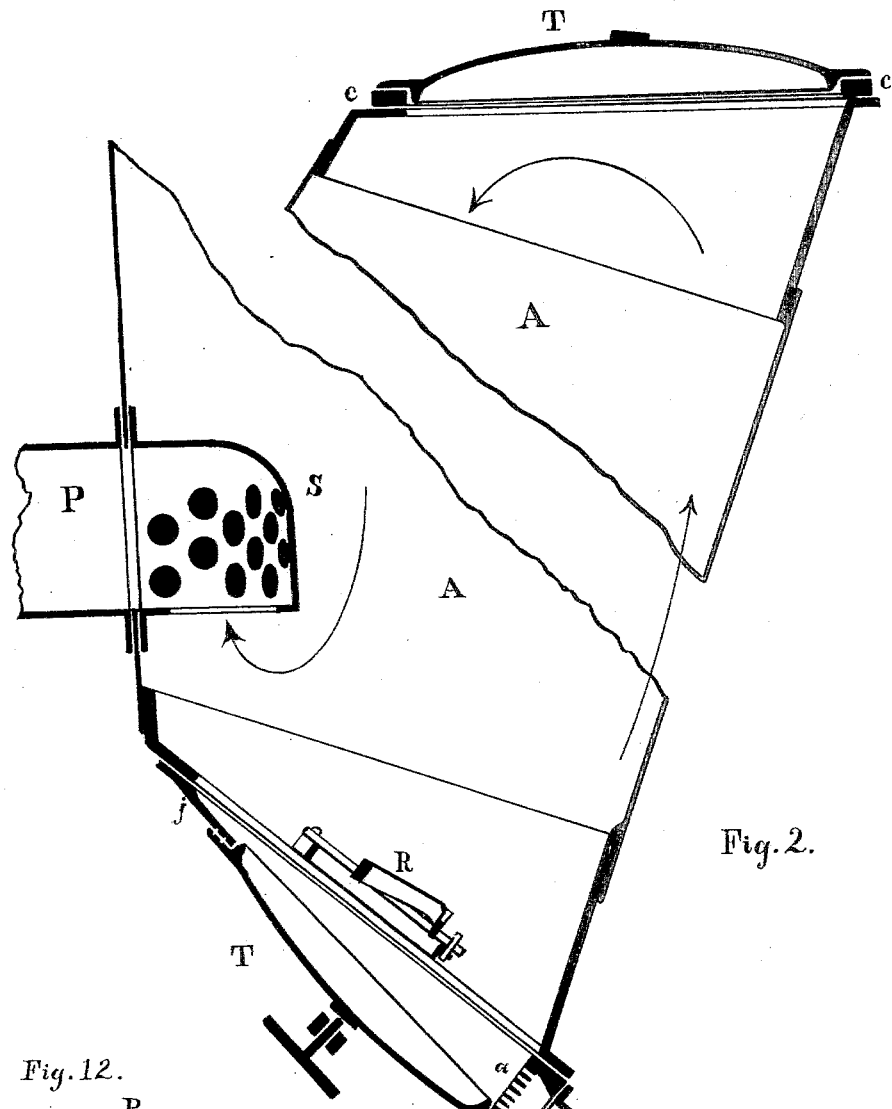
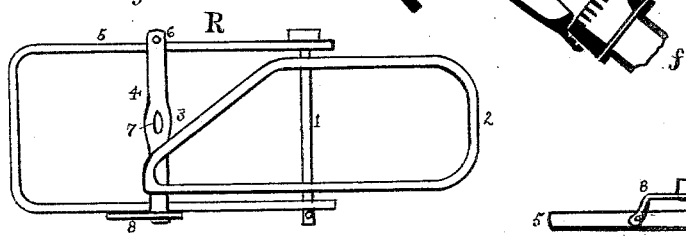
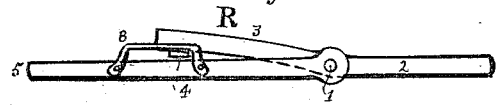
Witnesses  
Symmer Collins  
Geo. H. Carlisle
Inventor  
Jean A. Mathieu (No Model.) 7 Sheets—Sheet 3.
J. A. MATHIEU.
APPARATUS FOR DISTILLING WOOD.

No. 300,383. Patented June 17, 1884.

Witnesses
Sumner Collins
Geo. H. Carlisle

Inventor
Jean A. Mathieu (No Model.) 7 Sheets—Sheet 4.

J. A. MATHIEU.
APPARATUS FOR DISTILLING WOOD.

No. 300,383. Patented June 17, 1884.

(No Model.) 7 Sheets—Sheet 5.

J. A. MATHIEU.
APPARATUS FOR DISTILLING WOOD.

No. 300,383. Patented June 17, 1884.

Witnesses
Sumner Collins
Geo. H. Carlisle

Inventor
Jean A. Mathieu (No Model.) 7 Sheets—Sheet 6.
J. A. MATHIEU.
APPARATUS FOR DISTILLING WOOD.

No. 300,383. Patented June 17, 1884.

Witnesses

Inventor

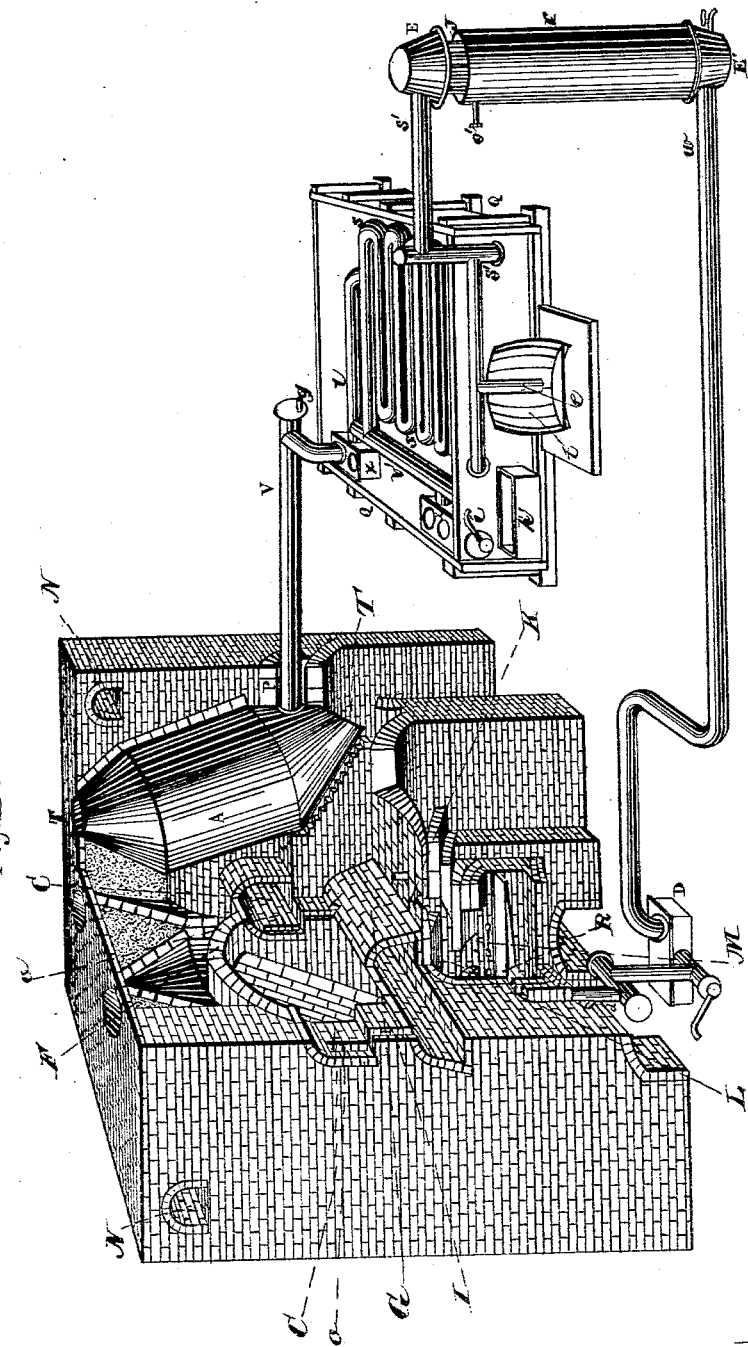

UNITED STATES PATENT OFFICE.

JEAN A. MATHIEU, OF DETROIT, MICHIGAN.

APPARATUS FOR DISTILLING WOOD.

SPECIFICATION forming part of Letters Patent No. 300,383, dated June 17, 1884.

Application filed December 4, 1882. (No model.)

*To all whom it may concern:*

Be it known that I, JEAN A. MATHIEU, of Detroit, in the county of Wayne and State of Michigan, have invented a new and useful Improvement in Process of and Apparatus for Distilling Wood and Separating the Products of Distillation, of which the following is a specification.

Figure 4:
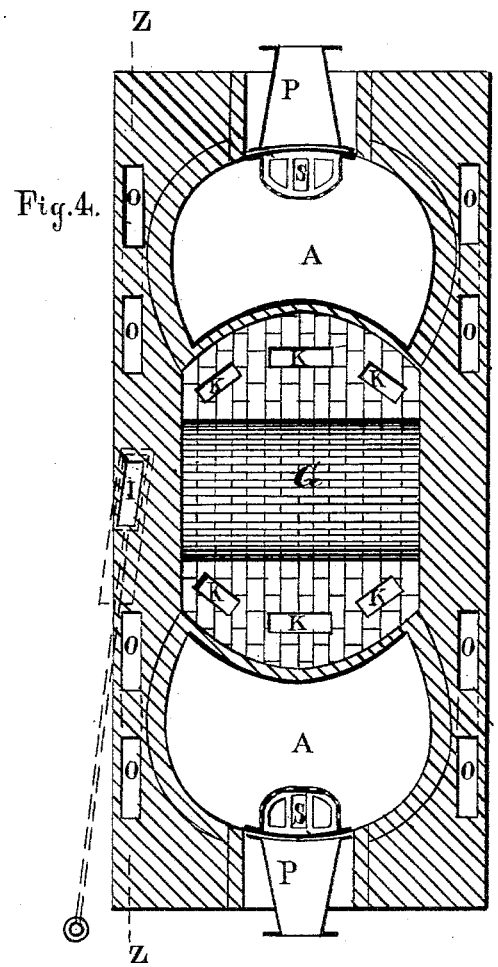
Figure 3:
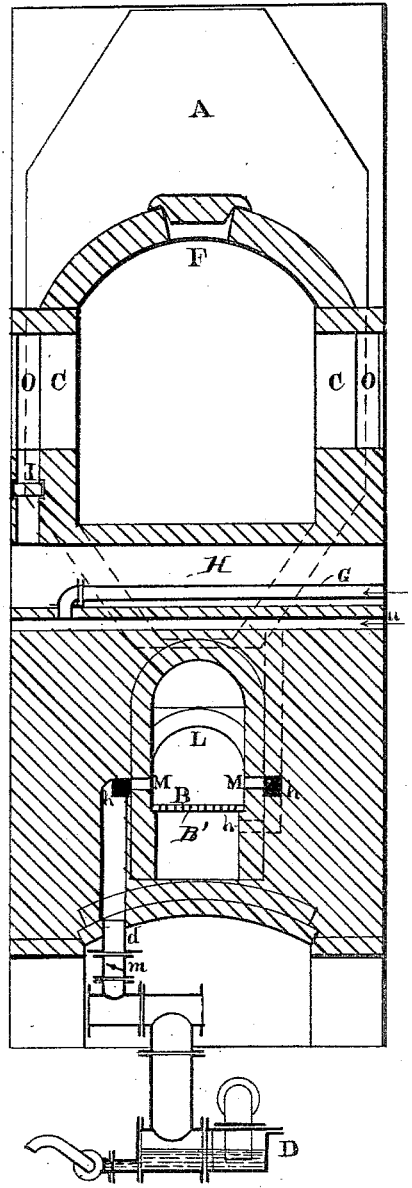
Figure 5:
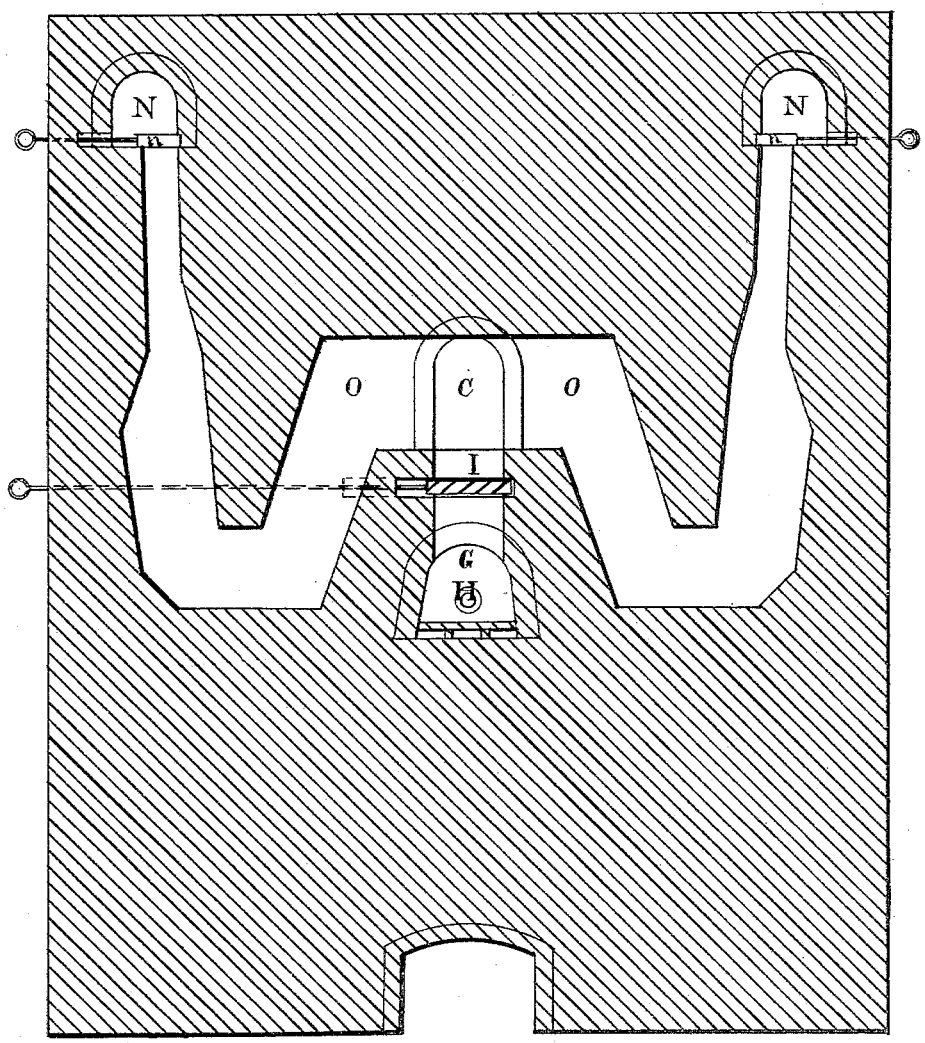
Figure 6:
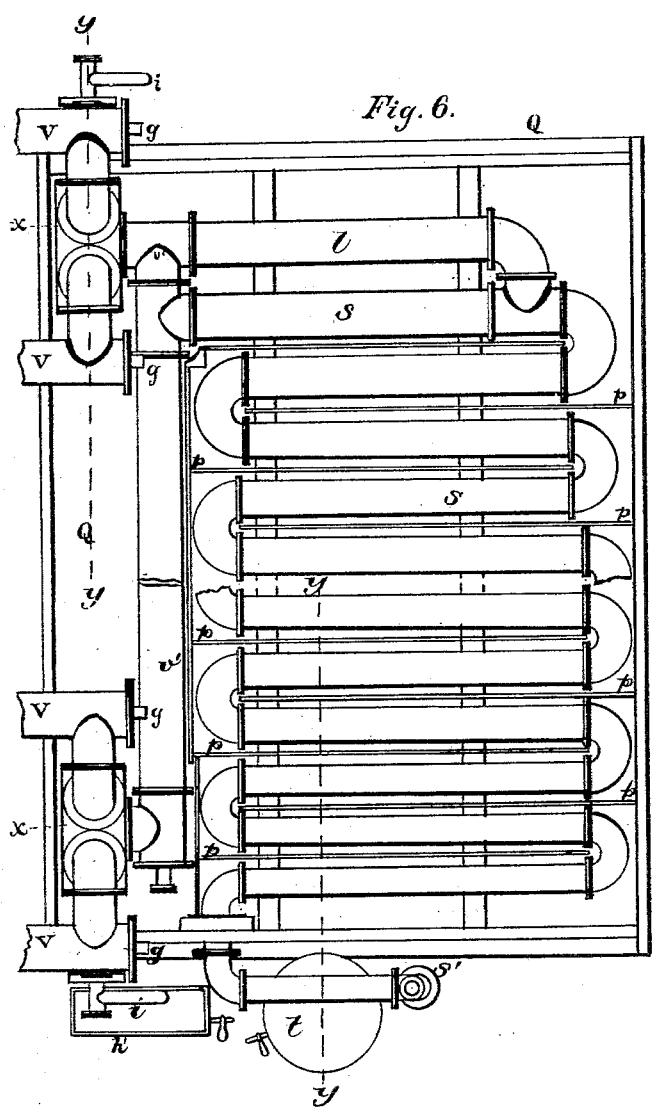
Figure 7:
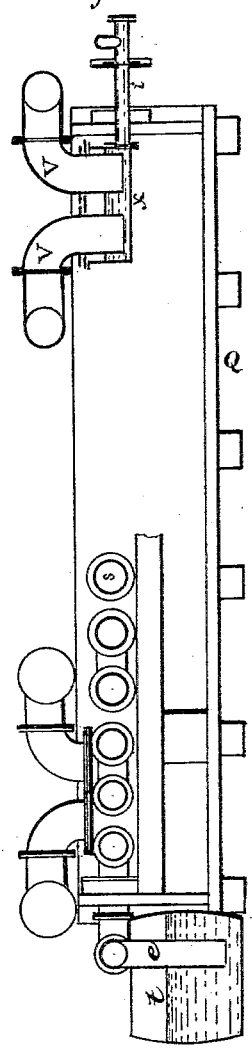
Figure 8:
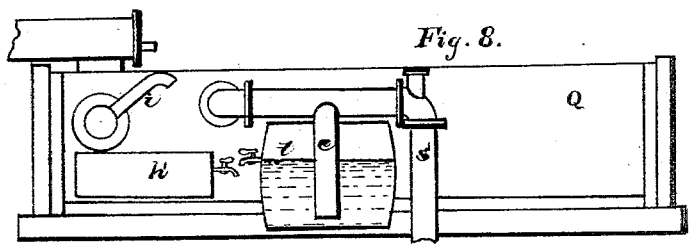
Figure 9:
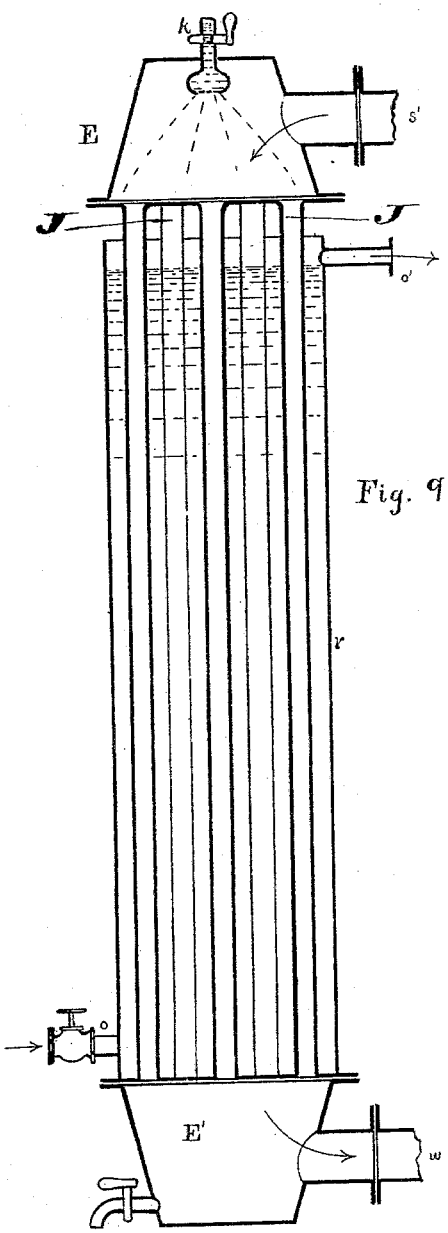
Figure 10:
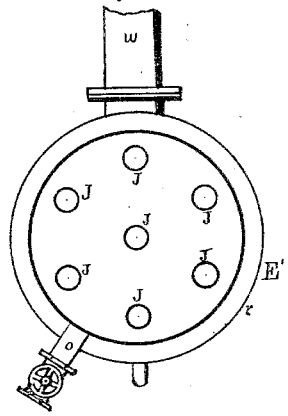

Figure 1 is a vertical section through the center of two retorts. Fig. 2 is an enlarged vertical section through the center of a retort. Fig. 3 is a vertical section at right angles to Fig. 1. Fig. 4 is a horizontal section on the line of pipes P, Fig. 1. Fig. 5 is a vertical section on line $z\,z$, Fig. 4. Fig. 6 is a plan view of the main condenser. Fig. 7 is a vertical section on lines $y\,y$, Fig. 6. Fig. 8 is an end view of the main condenser. Figs. 9 and 10 are respectively vertical and horizontal sections through the secondary condenser. Figs. 11 and 12 are respectively a side elevation and a plan view of a removable grating. Fig. 13 is a broken perspective view of the apparatus.

My invention relates to certain structural improvements in the apparatus for distilling wood and separating the products of distillation, patented to me October 8, 1878; and it consists, first, in providing the lower ends of the retorts with a grated discharge-pipe; second, in leading the products of combustion across the base of the retorts before allowing them to pass into the chimney; third, in an arrangement of flues and dampers by which the superfluous products of combustion can be led outside the furnace to heat steam-boilers; fourth, in an arrangement of flues by which heated air is fed to the fire which heats the retorts; fifth, in providing means for allowing a free circulation of air between two retorts to cool the same; sixth, in a peculiar form of connection with a main condenser, by which the wood-tar condensed is removed without being forced through the whole condenser, and an excess of pressure in one retort is prevented from forcing gas into another retort connected with the same condenser; seventh, in a secondary condenser, in which the partly-condensed gas is passed through a spray of cold pyroligneous acid; eighth, in a process of condensing a portion of the vapor arising from the distillation of wood, as hereinafter described.

The retorts A are similar in construction to the small retorts A shown in my patent of October 8, 1878, and when more than two retorts are used I set them in two rows, back to back. The retorts are inclosed with brick on all sides, so that no flame can strike them directly, and each couple is set in an inclined position, with their upper ends approaching each other, as shown in Fig. 1. All that portion of Fig. 1 which is shaded represents masonry, so it will be seen that between the two retorts A is an inclosed space, which I will call the "heat-chamber."

B represents a combustion-chamber under and between the retorts A, having the usual fire and draft doors, and a set of ordinary grate-bars, B', on which solid fuel can be burned.

M represents apertures in the wall of chamber B, through which a gaseous fuel is introduced into said chamber through safety apparatus D and pipe $d$, substantially as in my patent of October 8, 1878.

L represents a flue opening from the center of chamber B, and K K represent two flues leading in opposite directions from flue L, so that the products of combustion passing through flues L K K are directed upon the lining of the inner walls of the two retorts simultaneously. Flues K K are subdivided into two or three passages each, Fig. 4, to insure more even distribution of the heat; but I treat them herein as being each a single flue.

C represents a brick arch or flue opening out of each side of the heat-chamber, and connected with the flues O O, which pass downward across the lower ends of retorts A, and then upward into chimneys N N, so that the products of combustion, after heating the inner walls of retorts A, pass into arch C, then through flues O O, heating the lower ends of retorts A, and thence into the chimneys. Flues O O have dampers $n\,n$ therein, to regulate the draft therein.

G represents a brick arch or flue resting on the lower wall of the heat-chamber running the whole length of the row of retorts, and leading to a steam-boiler or other object outside the furnace to be heated. It is connected with each arch C by passages I, in each of which is a damper by which the admission of heat from arch C to arch G can be regulated at will. Arch G also serves to regulate the temperature of the heat-chamber and retorts, as it absorbs a large amount of heat and radiates the same on all sides.

F is a man-hole in the upper wall of the heat-chamber, having a cover, usually made of fire-brick, which can be removed to allow access to the interior of the furnace for examination and repairs. By extinguishing the fire in chamber B, opening the doors thereof, and removing the cover of man-hole F a rapid circulation of air is produced between the retorts, and the furnace cooled sufficiently to allow workmen to enter therein without stopping the operation of any other retorts.

H represents a pipe running from the outside air through arch G, and opening at intervals into a flue, $u$, arranged under arch G. From flue $u$ small flues $h$ run down to the combustion-chamber and open therein either above or below the grate. There may be one or more flues, $h$, to each combustion-chamber B. Fresh air, passing through pipe H and flues $u$ $h$, becomes heated, and is delivered in that state to combustion-chamber B, to promote combustion.

P P represent pipes leading from the retorts to the condenser. The inner ends of these pipes are covered by caps or gratings S, having openings in the sides and bottoms thereof, as shown in the drawings, so that the volatile products of distillation in said retorts can enter freely into said pipes P, while the wood and charcoal are excluded therefrom.

$c$ and $j$ represent iron rings, bolted, respectively, to the upper and lower ends of the retorts A. When the retorts are in use, the operation of putting on and taking off the covers T T and cleaning the retorts wears off the upper and lower edges of said retorts, and by the arrangement shown the wear is transferred from the retort proper to the rings $c$ $j$, which can be easily and cheaply renewed when worn.

$f$ represents a small pipe having at its inner end a grating, $a$, to exclude solid bodies, leading from the lower end of each retort A to draw off any wood-tar, turpentine, or pyroligneous acid which may collect in said retort. Each pipe $f$ is provided with a suitable stop-cock.

Q, Fig. 6, represents a water-tight box or trough, in which is a coil of pipe, $s$, to act as a condenser. Water is admitted at one end of box Q and drawn off at the other end, or, if preferred, at the same end, in which case a water-tight partition runs nearly the whole length of box Q, between the inlet and outlet pipes.

$x$ $x$ represent two metallic boxes, usually rectangular in form, placed in the corners of box Q. Pipes V, one for each retort, connected with the condenser, run into and nearly to the bottom of boxes $x$. Each pipe V is connected, preferably, by one or more swing-joints with the pipe P of a retort. In the dead end of each pipe V is a small opening closed by a plug of wood, $g$, which can be withdrawn to allow examination of the inside of pipe V. Boxes $x$ $x$ are connected by a large pipe, $v'$. Pipe $v'$ opens at one end into the end of coil $s$, and I prefer to connect one of boxes $x$ with coil $s$ at another point, as by pipe $l$, to insure a large and free connection between the boxes $x$ and coil $s$. Coil $s$ is made of iron pipe, as shown, lying horizontally in box Q. At the end where the coil $s$ connects with pipe $v'$ and box $x$, the pipe of which the coil is made should be as large as pipe $v'$; but it may gradually diminish in size, as clearly shown in Figs. 6 and 7, because as the gas in said coil becomes cooled its volume becomes reduced. The end of coil $s$ passes out through box Q, and has an elbow, $e$, Fig. 7, which is open at the bottom and dips into a tub, $t$, the main pipe $s'$ being continued to the secondary condenser. Each box $x$ is provided with a swinging discharge-pipe, $i$, through which the wood-tar, which generally collects largely at this point, is drawn off into a tank, $h'$, without being forced through the whole condenser. By elevating or depressing the end of pipe $i$, the pressure required to open the liquid seal in boxes $x$ can be easily regulated.

$p$ $p$ represent water-tight partitions in box Q, extending alternately from the longitudinal partition, before mentioned, and the opposite side of box Q, partly across the same, and placed between the pipes of coil $s$, so that the water passing through box Q circulates in a direction opposite to the course of the gas in coil $s$.

Safety apparatus D, boxes $x$ $x$, and tub $t$ are partly filled with water to form liquid seals therein before distillation is begun in retorts A, which water is gradually replaced by pyroligneous acid, &c., as distillation progresses. This seals the open ends of pipes V, and allows one retort to be opened and emptied without any danger of inflammable gas being forced from the full retorts into the empty one. From boxes $x$ $x$ the gas and pyroligneous acid pass into coil $s$, where the condensable substances contained in the gas are nearly all condensed and pass through elbow $e$ into tub $t$, while the uncondensed gases pass through pipe $s'$ to the secondary condenser.

The secondary condenser consists of two closed vessels, E E', connected by a number of pipes, J. Around the pipes J is a tank, $r$, open at the top, into the lower part of which water is forced through a pipe, $o$, escaping through a pipe, $o'$, near the top of tank $r$, to cool pipes J. Vessel E is connected with the main condenser by the pipe $s'$, and vessel E' is connected with the safety apparatus D by a pipe, $w$. A pipe, $k$, leads into the top of vessel E, and has on its lower end a rose. Cold pyroligneous acid is forced through pipe $k$, and escapes into vessel E in fine streams or spray.

The gas coming into vessel E through pipe $s'$ generally contains some methylic alcohol which has not been condensed in the main condenser, and when the spray of cold pyroligneous acid meets this gas it combines chemically with and condenses the methylic alcohol held in the gas, and the combined pyroligneous acid and methylic alcohol pass down with the gas through pipes J, and are collected in vessel E, whence they are drawn off through the faucet shown in Fig. 9, the uncondensed gas passing off through pipe $w$ to the safety apparatus D.

R, Fig. 2, represents a removable grating adapted to sustain the mass of material operated upon in retort A, and allow the removal of lower cover, T, without danger of having the mass of hot material fall upon the workmen employed.

5, Fig. 12, represents a U-shaped piece of iron, and 2 represents a smaller piece nearly the same shape, but having its inner ends bent upward and coming together within piece 5, as shown at 3.

4 is a latch, pivoted at 6 to one leg of U-shaped piece 5, the other end sliding on the other leg of piece 5, but limited in its motion by a keeper, 8, riveted to piece 5. Pieces 2 and 5 are pivoted together by a bolt, 1, as shown in Fig. 12. When grating R is placed across the lower end of retort A and latch 4 is placed under the projecting end 3 of piece 2, the grating firmly supports the material placed in the retort. By inserting a hook in hole 7 in latch 4, and pulling the free end of said latch away from end 3 of piece 2, the grating is collapsed and allows the material in retort A to fall into a bin or car placed to receive it.

In view of my patent of October 8, 1878, and the foregoing specification, I do not deem it necessary to further describe in detail the operation of my invention.

What I claim as my invention, and desire to secure by Letters Patent, is—

1. In combination with the retorts A A, having a heat-chamber between them, the flues O O, adapted to lead the products of combustion across the lower ends of said retorts before passing the same out of the furnace, substantially as and for the purposes set forth.

2. The combination of the retorts A A, arch C, passage I, and arch G, substantially as herein shown and described.

3. The combination of the retorts A A, inclosing a heat-chamber, combustion-chamber B, flues L K K, and man-hole F, having a removable cover, substantially as herein shown and described.

4. In combination with the retorts A A, a draft-flue opening from the outside air, running through the heated space between said retorts and opening into the combustion-chamber, from which said retorts are heated, either above or below the grate therein.

5. In combination with the retorts A A, the box $x$, connected with the exit-pipes of said retorts, having the swinging discharge-pipe $i$, and connected with a condensing-coil, $s$, substantially as herein shown and described.

6. The combustion-chamber B, flue L, and flues K K, in combination with the retorts A A, substantially as herein shown and described.

7. The herein-described process of condensing a portion of the vapor arising from the distillation of wood, consisting in bringing said vapor in contact with a spray of cold pyroligneous acid, whereby condensation is effected by the chemical affinity of the acid and vapor, as well as by reducing the temperature of said vapor.

8. In combination with the retorts A, the pipes $f$, leading from the lower end of each retort, and having at their inner ends a grating, $a$, substantially as described.

9. The condenser herein described, having vessel E, with pipes $k$ $s'$, and vessel E', having a faucet, and pipe $w$, said vessels being connected by pipes J, substantially as herein shown and described.

JEAN A. MATHIEU.

Witnesses:
CHARLES B. LOTHROP,
GEO. H. CARLISLE.